United States Patent
Harris et al.

(10) Patent No.: US 9,450,452 B2
(45) Date of Patent: Sep. 20, 2016

(54) TRANSFORMER COUPLED CURRENT CAPPING POWER SUPPLY TOPOLOGY

(75) Inventors: Shaun L. Harris, Sammamish, WA (US); Eric C. Peterson, Woodinville, WA (US)

(73) Assignee: Micorsoft Technology Licensing, LLC, Redmond, WA (US)

( * ) Notice: Subject to any disclaimer, the term of this patent is extended or adjusted under 35 U.S.C. 154(b) by 729 days.

(21) Appl. No.: 13/438,540

(22) Filed: Apr. 3, 2012

(65) Prior Publication Data

US 2013/0257160 A1 Oct. 3, 2013

(51) Int. Cl.
*H02J 1/00* (2006.01)
*H02J 9/06* (2006.01)

(52) U.S. Cl.
CPC .............. *H02J 9/06* (2013.01); *Y10T 307/696* (2015.04)

(58) Field of Classification Search
CPC ........ H02J 9/06; H02J 9/00; H02J 2009/067; H02J 7/0068
USPC ......................................... 307/64–66, 44–46
See application file for complete search history.

(56) References Cited

U.S. PATENT DOCUMENTS

| | | | |
|---|---|---|---|
| 4,238,690 A | 12/1980 | Clarke | |
| 4,488,057 A | 12/1984 | Clarke | |
| 4,564,767 A | 1/1986 | Charych | |
| 5,210,685 A | 5/1993 | Rosa | |
| 5,289,045 A | 2/1994 | Lavin et al. | |
| 5,670,833 A * | 9/1997 | Mengelt et al. | 307/66 |
| 5,781,422 A * | 7/1998 | Lavin et al. | 363/37 |
| 6,212,081 B1 | 4/2001 | Sakai | |
| 6,657,320 B1 | 12/2003 | Andrews et al. | |
| 2004/0032237 A1* | 2/2004 | Dykeman | H02J 7/0093 320/141 |
| 2006/0103242 A1* | 5/2006 | Lin | H02J 9/062 307/66 |
| 2009/0021078 A1 | 1/2009 | Corhodzic et al. | |
| 2009/0195230 A1* | 8/2009 | Adkins | H02M 3/156 323/282 |
| 2010/0232180 A1 | 9/2010 | Sase et al. | |
| 2010/0295700 A1* | 11/2010 | Mauk et al. | 340/825.52 |
| 2010/0315849 A1* | 12/2010 | Ingemi et al. | 363/89 |
| 2011/0072290 A1 | 3/2011 | Davis | |
| 2011/0096522 A1 | 4/2011 | Humphrey | |

(Continued)

FOREIGN PATENT DOCUMENTS

| | | |
|---|---|---|
| CN | 1274188 A | 11/2000 |
| EP | 0243061 A2 | 10/1987 |
| WO | 96/22627 A1 | 7/1996 |

OTHER PUBLICATIONS

"International Search Report & Written Opinion for PCT Patent Application No. PCT/US2013/034871", Mailed Date: Sep. 23, 2013, Filed Date: Apr. 2, 2013, 9 pages.

(Continued)

*Primary Examiner* — Jared Fureman
*Assistant Examiner* — Joel Barnett
(74) *Attorney, Agent, or Firm* — Judy Yee; Micky Minhas

(57) ABSTRACT

Described is a technology by which magnetic flux is used to provide backup power. A transformer has a line power source controllably coupled to a first input winding, and secondary power source controllably coupled to a second input winding. A controller monitors the line power and switches to the secondary power source if the line power voltage drops too low, or uses the secondary power source to augment the line power source if the line power current gets too high. Also described is incrementally transitioning from the secondary power source back to the line power source.

20 Claims, 3 Drawing Sheets

(56) References Cited

U.S. PATENT DOCUMENTS

| | | |
|---|---|---|
| 2011/0156480 A1 | 6/2011 | Park |
| 2012/0146587 A1 | 6/2012 | Srinivasan et al. |
| 2012/0293000 A1* | 11/2012 | Fan et al. .................. 307/64 |
| 2012/0331317 A1 | 12/2012 | Rogers et al. |
| 2013/0007515 A1 | 1/2013 | Shaw et al. |
| 2013/0163192 A1 | 6/2013 | Ballantine et al. |
| 2013/0253716 A1 | 9/2013 | Gross et al. |
| 2013/0307339 A1 | 11/2013 | Subramanium et al. |

OTHER PUBLICATIONS

"First Office Action and Search Report Issued in Chinese Patent Application No. 201310116343.X", Mailed Date: Aug. 1, 2014, 13 pages.

Riekstin, et al., "No More Electrical Infrastructure: Towards Fuel Cell Powered Data Centers", In Proceedings of Workshop on Power-Aware Computing and Systems, Nov. 3, 2013, 5 pages.

Aksanli, et al., "Architecting Efficient Peak Power Shaving Using Batteries in Data Centers", In Proceedings of IEEE 21st International Symposium on Modeling, Analysis and Simulation of Computer and Telecommunication Systems, Aug. 14, 2013, 12 pages.

Kontorinis, et al., "Managing Distributed UPS Energy for Effective Power Capping in Data Centers", In Proceedings of the 38th Annual International Symposium on Computer Architecture, Jun. 9, 2012, 12 pages.

Peterson, et al., "Power Supply for Use with a Slow-Response Power Source", U.S. Appl. No. 14/169,088, filed Jan. 30, 2014.

"Power and Cooling Solutions", available at: <<http://www.compucallinc.com/liebert-ups-power-liebert-cooling-solutions/>>, Compu-Call, Inc., accessed on Oct. 13, 2011, 3 pages.

Loeffler, Chris, "What Your IT Equipment Needs from a UPS", available at: <<http://lit.powerware.com/ll_download_bylitcode.asp?doc_id=11666>>, Eaton Corporation, Apr. 30, 2009, 11 pages.

"XP Power Supply Technical Guide", available at: <<http://www.xppower.com/pdfs/techguide.pdf>>, XP Power plc, 2007, 152 pages.

Peterson, et al. "Power Supply for Use with a Slow-Response Power Source", PCT Application No. PCT/US2015/012555, filed Jan. 23, 2015.

* cited by examiner

TRANSFORMER COUPLED CURRENT CAPPING POWER SUPPLY TOPOLOGY

BACKGROUND

Uninterruptible power supplies (UPS) designs typically work by inputting AC, rectifying the AC to DC that is coupled to a battery, and then inverting the battery output back to AC power. In the event the input AC goes away, the battery continues supplying the inverter with power until AC power returns or the battery is drained.

However, even high efficiency uninterruptible power supplies lose a lot of energy, primarily to heat, and at best may be on the order of ninety-three percent efficient in contemporary designs. This loss is highly undesirable in large data center scenarios where megawatts of power are typically needed. One solution provides a complex, customized design that bypasses the battery when AC is available. However, this is also expensive.

AC/DC rack level or in server battery backup/UPS designs create problems for high impedance power sources such as diesel generators (which are run when the regular source of AC power is lost, before the batteries are drained). One problem is that when the input voltage (VAC) drops below a specified (Under Voltage Protection, or UVP) level, the server powers supplies shut off and transfer load the local energy storage. When the generator is ready VAC input voltage increases to the point of operation, the power supply automatically turns on, the server load is removed from the local energy storage, and picked up by the power supply and then the generator. At this time, generator experiences an abrupt load increase from zero to one-hundred percent, e.g., a 2.5MW generator needs to transition from 0 W to 2.5MW with 10 msec from 10,000 250 W servers. Due to the high output impedance characteristic of the generator, a high rate transient load increase causes an output voltage droop. The voltage droop is substantial enough to trip the UVP in the power supplies which summarily shut off and remove the load from the generator (one-hundred percent to zero percent transition). A continuous "on/off/on/off" or "motor boating" of energy dump is created. This behavior continues until local energy storage is depleted and cannot sustain the servers during the loss of VAC, or a component failure in the generator, distribution, or server power supply occurs.

Methods to correct this problem at the server include varying the UVP threshold, VAC good threshold, and soft start circuit delay circuits. For a server application on the order of ten thousand of servers this introduces several thousand power supply designs, each with its own turn off-and-on signature. Even then, this method is not fail proof. Further, the addition of power supply designs/part numbers increases the cost of unit production as well as warranty repair management.

A second tier control of reloading the generator is to delay the static transfer switchover. This still creates a block loading effect. Combined with variable turn off/turn on signatures, this is solution is complicated to deploy, expense to manufacture, and support.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a first power source and a second power source are controllable coupled through magnetic flux to provide a power supply. Switching mechanisms are automatically controlled to input power from the first power source to a first transformer winding, or to input power from the second power source to a second transformer winding, or to both. Voltage and/or current monitoring may be used to control the switching mechanisms.

In one aspect, a load transfer mechanism for a power supply includes a transformer having a first input winding, a second input winding, and an output winding. A controller switches load between the first and second sources of power, or both, to achieve a desired output voltage corresponding to the output winding. The controller monitors power supply state to determine the switching of the load, including by selectively coupling the first source of power to the first input winding, or the second source of power to the second input winding, or both, based upon the power supply state. The controller may incrementally transitions at least some of the load from one source of power to the other source of power based upon the monitored state.

One aspect is directed towards monitoring input voltage corresponding to power from a first power source coupled to a first input winding of a transformer. If the input voltage drops below an under voltage protection threshold, described is switching to couple power from a second power source to a second input winding of the transformer. Also descried is monitoring current corresponding to power from the first power source, and if the current exceeds an over current state, switching to couple at least some power from the second power source to the second input winding of the transformer.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an integrated load transfer mechanism for an isolated power supply (e.g., AC/DC) with active power factor correction. The technology operates via the introduction of magnetic flux at the primary isolation transformer fed from local energy storage devices, typically batteries. As will be understood, the technology is able to limit line cord current magnitude and rate of increase for the purpose of providing local energy backup/ride through, graceful controlled reloading (zero to one hundred percent) of high impedance AC sources and line cord power capping.

It should be understood that any of the examples herein are non-limiting. For example, the technology is exemplified with respect to AC power in and DC power out, however the input may be AC power or DC power, of any suitable voltage, and the output may be DC or AC. Further, while the technology is generally applicable to IT power systems that support and operate through AC loss, AC brownout or sag, which are sourced from high impedance local power generation such as diesel generators, the technology applies to other applications, such as relatively small backup systems. Still further, while a voltage-based power supply that outputs a desired voltage is described, a current-based power supply that outputs a desired current is equivalent. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in power supply technology in general.

Figure 1:
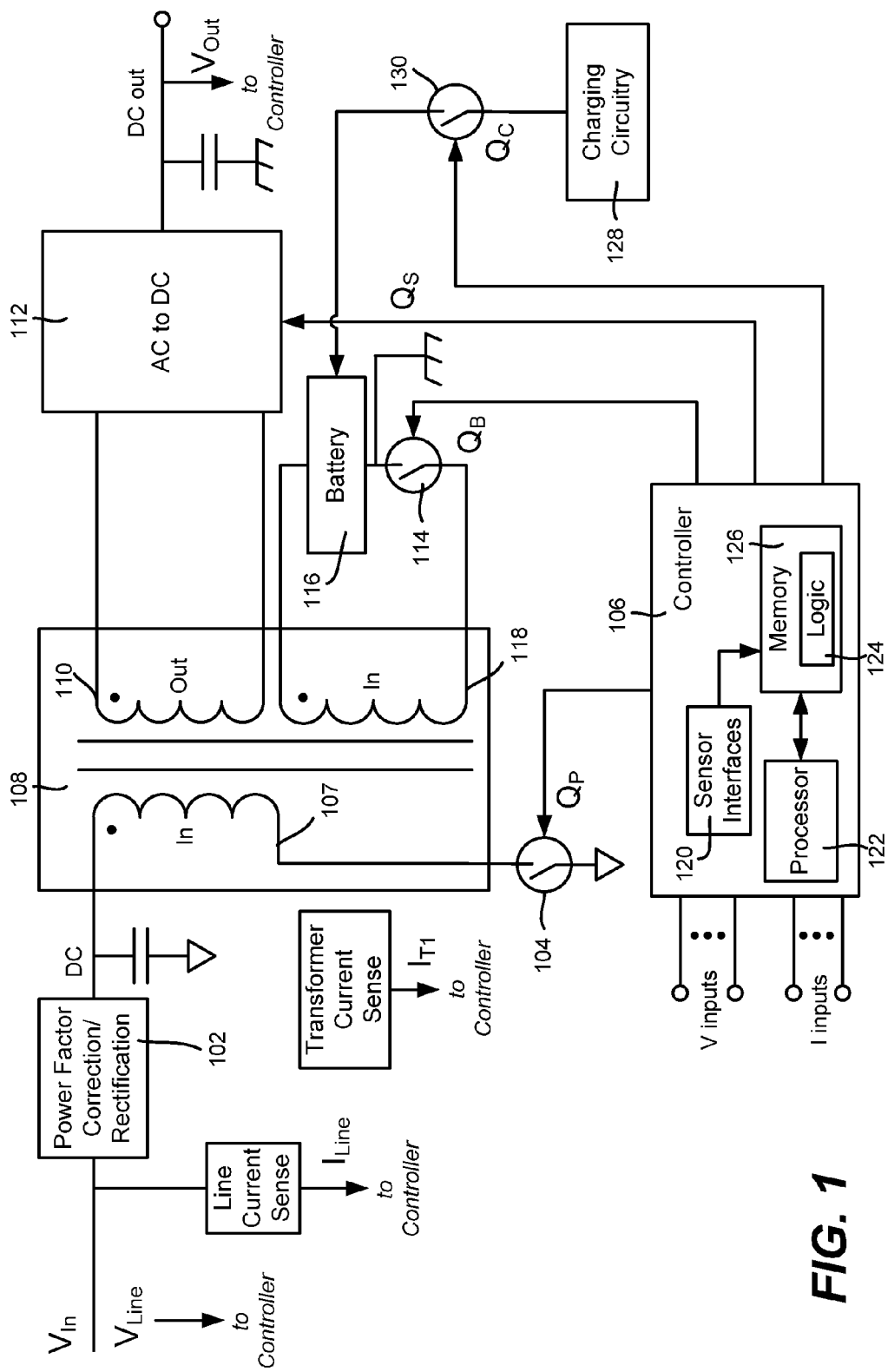
FIG. 1 is a block diagram showing example components of a transformer coupled current capping power supply topology according to one example implementation.

FIG. 1 shows components of one example implementation of a power supply configured in accordance with the technology described herein. Input AC voltage, referred to as Vin, is converted to DC power via conventional power factor correction and rectification (block 102). In normal operation, a switch mechanism 104 (e.g., comprising one or more FETs) is pulsed by a controller 106 (e.g., a pulse width modulation controller) to produce rectified AC that is fed through a primary side transformer 107, e.g., a ferrite core isolation transformer 108. This in turn causes the secondary side transformer 110 to produce AC, which is rectified to DC power (block 112), which may be used for any suitable purpose, including powering a computer system.

As described herein, the controller 106 may control another switch mechanism 114 (e.g., FET-based) to provide local energy storage (e.g., power from battery 116) AC-rectified power to another transformer winding 118, thereby introducing magnetic flux instead or in addition to the magnetic flux from the primary (line cord-based) winding, basically creating a dual input, single output transformer design. The local energy storage may be an integral component of the power supply (e.g., built into a computer system) or may be a pluggable device.

In one implementation, the controller includes sensor interfaces 120 for monitoring various power supply state data including voltages and currents in the power supply, and performing various operations based upon the power supply's operating state, as described herein. As shown in the example controller 106 of FIG. 1, a controller processor 122 runs logic 124 in a memory 126 to perform such operations. The controller 106 may be implemented in any suitable hardware and/or software device. One operation that may be performed by the controller 106 includes controlling charging circuitry 128 via a suitable switch mechanism 130. Ways to charge the battery (in normal operation) include off the DC power, or off the transformer $T_1$.

In one implementation, the controller 106 monitors the input line current ($I_{line}$), input voltage ($V_{line}$), isolation transformer current ($I_{T1}$), primary side transformer FET switching duty cycle ($Q_P$), secondary side transformer FET switching duty cycle ($Q_S$), battery discharge FET duty cycle ($Q_B$), battery charge FET duty cycle and output voltage ($V_{out}$). The controller 106 acts on the monitored points, adjusting $Q_P$, $Q_S$, $Q_B$ and $Q_c$ such that the output voltage is within a desired range, including while encountering AC loss and return, AC brownout or sag and return, and during high rate load transients. Note that the controller may be powered from the primary side and have its ground relative thereto, with a separate battery backup (e.g., a small watch/medical-type batter) or battery backup from the secondary side via an isolation transformer so operation continues while the primary side is not providing voltage. Because the transformer is an isolation transformer, optical coupling or other mechanisms may be used to allow the controller to control the switches/monitor the secondary side. Alternatively, the controller may run on the secondary side, with chassis ground and similar isolation to allow signaling/monitoring on with the primary side.

Figure 2:
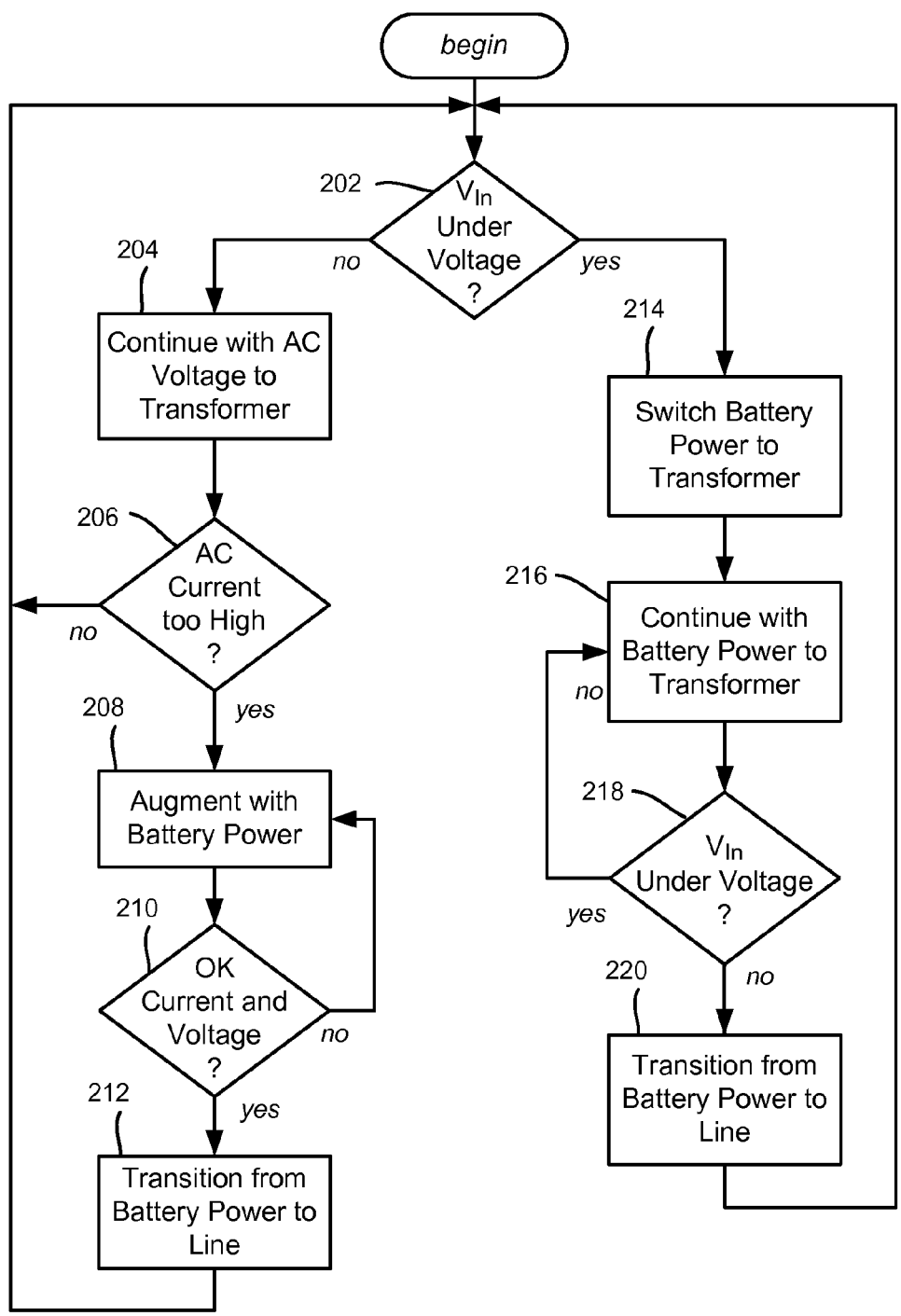
FIG. 2 is a flow diagram showing example steps that may be taken by a controller to operate a transformer coupled current capping power supply.

FIG. 2 is a flow diagram showing various example operations of the exemplified controller 106. For purposes of description, the following nomenclature may be used:

Period of time for loading the generator from 0% to 100% (P)

Steps required for loading the generator from 0% to 100% (S)

Time between steps of reloading increase ($t_{Step}$)

$$t_{Step}=(P)/(S)$$

Magnitude of load step between steps of reloading ($L_{Step}$)

$$L_{Step}=\text{(generator capacity)/(number of steps in reloading)}$$

VAC input voltage ($V_{In}$)
Input current ($I_{Line}$)
Battery switching duty cycle ($Q_B$)
Primary transformer switching duty cycle ($Q_P$)
Primary transformer current ($I_{T1}$)
DC output voltage ($V_{out}$)
DC output switching duty cycle ($Q_S$)
Battery charge switching duty cycle ($Q_C$)

The example steps of FIG. 2 include how the controller operates during AC Fault and severe brown out/sag conditions, in which the voltage input magnitude droops below acceptable levels below under voltage protection threshold and returns to acceptable voltage levels after a period of time. In this state, the input line current does not exceed acceptable thresholds. FIG. 2 also includes steps for handling nominal brown out/sag conditions, in which the voltage input magnitude droops below acceptable levels but remains above the under voltage protection threshold. This results in increased input line current exceeding acceptable levels. The input line current is reduced upon input voltage returning to acceptable levels after a period of time.

Step 202 represents evaluating the input voltage Vin against the under voltage protection threshold. If not in an under voltage state, step 202 branches to steps 204 and 206 where the current is checked against an over current threshold. If the input voltage and the current are acceptable, the controller continues to operate the power supply operates normally. If the input voltage is acceptable but the current is too high (e.g., a nominal brownout condition), then step 208 represents controlling the switch duty cycles to augment the line input voltage power with battery power. This continues until the line voltage and current are acceptable, at which time the controller transitions away from battery power, e.g., in incremental steps, as represented via step 210 and 212.

If instead at step 202 the input voltage is in an under voltage state, step 202 branches to step 214 and 216 where the switches are controlled to switch the power supply to supply magnetic flux to the transformer from the battery. This continues until the under voltage condition ends. However, as described herein, the controller 106 does not switch directly back to $V_{in}$ primary transformer side (from the AC line in or a generator), but instead controllably transitions the power supply from the battery back to the $V_{in}$ primary transformer side power.

Summarizing using the above nomenclature, for nominal brownout/sag conditions, if the VAC Input Voltage ($V_{In}$) >=the under voltage protection threshold and input current ($I_{Line}$)<over current protection threshold power supply operates normally, as represented via steps 202, 204 and 206. If the VAC input voltage ($V_{In}$)>the under voltage protection threshold but the input current ($I_{Line}$)>over current protection threshold, power supply conversion decreases energy taken from the line cord by a reduction of primary transformer switching duty cycle ($Q_P$). Simultaneously, additional energy is pulled from the LES into the primary transformer such that such that DC Output Switching Duty Cycle ($Q_S$) is able maintain desired DC Output Voltage ($V_{out}$). These concepts are represented by step 208.

As represented via steps 210 and 212), when the VAC input voltage ($V_{In}$) increases to (or remains at) acceptable levels and input current ($I_{Line}$) falls below over current protection threshold the controller 106 begins to increase the duty cycle to ($Q_P$), introducing additional energy into $T_1$ such that the current input ($I_{Line}$) is less than the calculated $L_{Step}$. The controller 106 may increase the duty cycle to ($Q_P$) at a $t_{Step}$ rate. During this process, the battery switching duty cycle ($Q_B$) is reduced accordingly such that the DC output switching duty cycle ($Q_S$) is able to maintain the desired DC Output Voltage ($V_{out}$). Once the battery switching duty cycle ($Q_B$) is reduced to zero, the power supply is in normal operation.

For AC Fault and severe brownout/sag conditions, this may be stated as:

If VAC Input Voltage ($V_{In}$)>=under voltage protection threshold, the power supply operates normally.

If the VAC Input Voltage ($V_{In}$)<=the under voltage protection threshold (step 202), power supply conversion stops with the primary transformer switching duty cycle ($Q_P$) controlled to zero. At this time, the battery switching duty cycle ($Q_B$) increases (step 214), pulling energy from the local energy storage (e.g., battery or batteries) into the primary transformer such that $V_{out}$ is regulated.

When the VAC input voltage ($V_{In}$)>the under voltage protection threshold (at step 218), the controller begins to increase the duty cycle to ($Q_P$), introducing additional energy into $T_1$ such that the current input ($I_{Line}$) is less than calculated $L_{Step}$. The controller 106 may increase the duty cycle to ($Q_P$) at the $t_{Step}$ rate. During this transition process (step 220) the battery switching duty cycle ($Q_B$) is reduced accordingly such that the DC output switching duty cycle ($Q_S$) is able to maintain the desired DC Output Voltage ($V_{out}$). Once the battery switching duty cycle ($Q_B$) is reduced to zero, the power supply is in normal operation.

As can be seen with this topology, integrating the battery energy into the $T_1$ transformer allows for increased low voltage operational range as the energy pulled from the line cord is proportional to voltage and can work down to much lower voltage values than presently acceptable. A byproduct is that the LES holdup/ride through time can be extended. The under voltage threshold point no longer need be derived from the line cord fuse/breaker, but by functional duty cycle and operating voltage at the primary transformer.

Turning to additional aspects, the technology may be used to facilitate power smoothing. For example, consider a set of ten thousand servers that generally run at eight amperes each, but occasionally spike to thirteen amperes during occasional rare periods of high demand. Providing the capacity to run ten thousand servers at up to thirteen amps each is very expensive, and thus in many situations the number of available servers heretofore needed to be reduced because sufficient power was not available. The technology described herein allows the extra current needed on only rare occasions to be drawn from the battery, whereby all suitably-equipped servers may remain available.

Further, to implement the technology in many scenarios, smaller, longer lasting (e.g., lithium ion) batteries may be used relative to larger batteries (e.g., lead acid) used in other technologies. A larger transformer is used, however the corresponding cost is relatively inexpensive.

Figure 3:
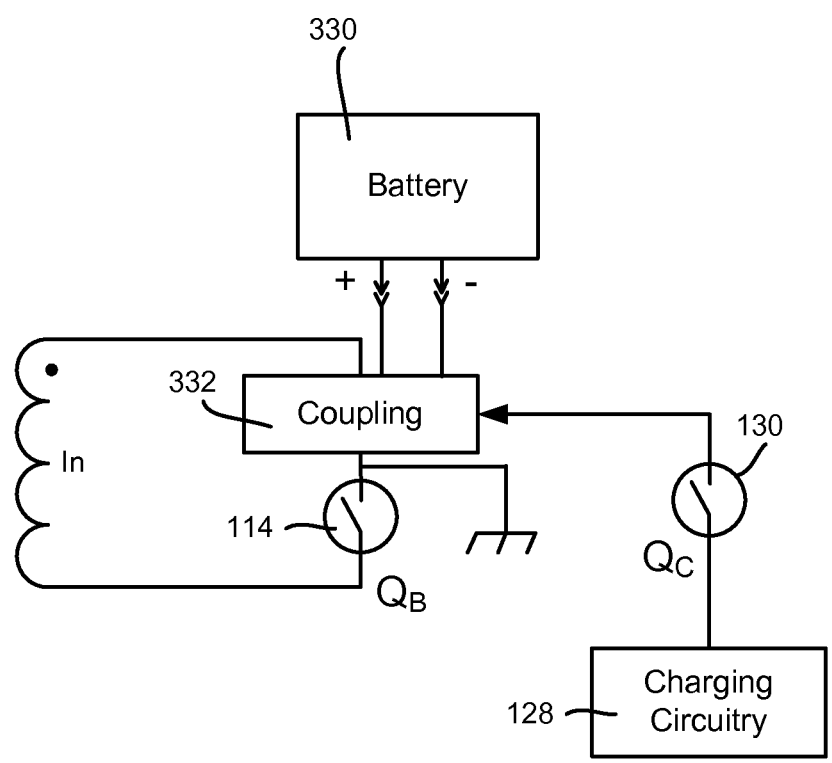
FIG. 3 is a block diagram representing how a battery may be selectively coupled to a transformer coupled current capping power supply.

In home and small office scenarios, a power supply may be provided in a computer system that allows battery backup to be obtaining by plugging in a suitable battery. For example, in FIG. 3, having a rechargeable battery 330 coupled to the power supply via a coupling 332 such as a jack or other suitable connector allows an optionally attached battery backup. The coupling 332 may be external to the computer system, or inside the computing device's cover. Any appliance with a power supply may benefit from a similar pluggable battery backup system; an inverter may be used for AC appliances.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A load transfer mechanism for a power supply, the load transfer mechanism comprising:

a transformer having a first input winding, a second input winding, and an output winding, the first input winding corresponding to a primary side isolated from a secondary side corresponding to the output winding, the output winding corresponding to a rectifier configured to convert alternating current to direct current;

a controller configured to switch load associated with the output winding between at least one of a first source of power associated with the first input winding or a second source of power associated with the second input winding to achieve a desired output voltage corresponding to the output winding; and a first coupling mechanism configured to provide selective coupling and decoupling of a charging circuitry to the second source of power, wherein the controller is configured for:

monitoring a power supply state associated with the first input winding, a first duty cycle associated with charging the second source of power, and a second duty cycle associated with the rectifier to determine switching of the load, selectively coupling the first source of power to the first input winding, and selectively controlling the first coupling mechanism to selectively recharge the second source of power based upon the first duty cycle associated with charging the second source of power.

2. The load transfer mechanism of claim 1 wherein the controller is further configured to detect an under voltage protection state corresponding to the first source of power, and in response, to switch the load to the second source of power.

3. The load transfer of claim 2 wherein the controller no longer detects the under voltage protection state corresponding to the first source of power, and wherein in response, the controller incrementally transitions at least some of the load from the second source of power to the first source of power.

4. The load transfer mechanism of claim 3 wherein the controller is configured to incrementally transition the at least some of the load by increasing a third duty cycle associated with the first source of power and by decreasing a fourth duty cycle corresponding with the second source of power.

5. The load transfer mechanism of claim 1 wherein the controller is further configured to detect an over current state corresponding to the first source of power, and in response, to switch at least part of the load to the second source of power.

6. The load transfer mechanism of claim 5 wherein the controller no longer detects the over current state corresponding to the first source of power, and wherein in response, the controller incrementally transitions at least some of the load from the second source of power to the first source of power.

7. The load transfer mechanism of claim 6 wherein the controller incrementally transitions the at least some of the load by increasing a third duty cycle associated with the first source of power and by decreasing a fourth duty cycle associated with the second source of power.

8. The load transfer mechanism of claim 1 wherein the load transfer mechanism is coupled to a computer system.

9. The load transfer mechanism of claim 1 further comprising a coupling mechanism configured to provide selective coupling and decoupling of the second source of power to the load transfer mechanism, wherein the controller is configured to monitor the first duty cycle associated with the second source of power to determine switching of the load and, based at least in part on the first duty cycle associated with the second source of power, control the second coupling mechanism.

10. The load transfer mechanism of claim 1 wherein the controller runs on the primary side with respect to voltage and ground, and wherein the second input winding corresponds to the secondary side.

11. The load transfer mechanism of claim 1 wherein the controller runs on the secondary side with respect to voltage and ground, and wherein the second input winding corresponds to the secondary side.

12. The load transfer mechanism of claim 1 wherein the controller is coupled to a backup power source to allow the controller to operate when no power is available from the first or second source of power.

13. One or more computer memory apparatus having computer-executable instructions, which, upon execution, perform operations comprising:
monitoring, at one or more sensor interfaces, a power supply state associated with a first input winding, a duty cycle associated with charging a local energy storage that is associated with a second input winding, and a duty cycle associated with a rectifier, the first input winding corresponding to a primary side of a transformer isolated from a secondary side of the transformer corresponding to an output winding corresponding to the rectifier, and
switching load associated with the output winding between a first source of power associated with the first input winding and the local energy storage associated with the second input winding to achieve a desired output voltage corresponding to the output winding through selectively controlling a coupling mechanism to selectively recharge the local energy storage, based upon at least the duty cycle associated with charging the local energy, storage.

14. The one or more computer-readable media of claim 13 having further computer-executable instructions, which, upon execution, perform operations comprising detecting that an input voltage is below an under voltage protection threshold and, in response, switching power from the local energy storage to the second input winding of the transformer, and detecting that the input voltage is no longer below the under voltage protection threshold, and in response, switching to couple power from the first source of power to the first input winding of the transformer.

15. The one or more computer memory apparatus of claim 13 having further computer-executable instructions, which, upon execution, perform operations comprising monitoring current corresponding to power from the first source of power, and if the current exceeds an over current state, switching to couple at least some power from the local energy storage to the second input winding of the transformer.

16. The one or more computer memory apparatus of claim 15 having further computer-executable instructions, which, upon execution, perform operations comprising detecting that an input current no longer exceeds the over current state, and in response, switching to decouple at least some of the power from the local energy storage to the second input winding of the transformer.

17. A method comprising:
monitoring a power supply state associated with a first transformer winding, a first duty cycle associated with charging a local energy storage that is associated with a second transformer winding, and a second duty cycle associated with a rectifier, the first transformer winding corresponding to a primary side of a transformer isolated from a secondary side of the transformer corresponding to an output winding corresponding to the rectifier configured to convert alternating current to direct current; and
switching load associated with the output winding between a first power source associated with the first transformer winding and the local energy storage associated with the second transformer winding to achieve a desired output voltage corresponding to the output winding by controllably coupling the first power source and the local energy storage through magnetic flux to provide a power supply, including automatically controlling switching mechanisms to input power from the local energy storage to the second transformer winding based upon the first duty cycle associated with charging the local energy storage.

18. The method of claim 17 further comprising, monitoring a voltage level corresponding to the first power source, and controllably coupling the local energy storage to the second transformer winding when the voltage level is below a threshold.

19. The method of claim 17 further comprising, monitoring a current level corresponding to the first power source, and controllably coupling the local energy storage to the second transformer winding when the current level is above a threshold.

20. The method of claim 17 further comprising monitoring a first duty cycle associated with the local energy storage, and controllably coupling the local energy storage to the transformer based at least in part on the second duty cycle associated with the local energy source.

* * * * *